United States Patent [19]
Okuchi et al.

[11] Patent Number: 5,562,335
[45] Date of Patent: Oct. 8, 1996

[54] LIGHTING DEVICE FOR VEHICLES

[75] Inventors: Hiroaki Okuchi, Anjo; Hideyuki Kato, Nishio, both of Japan

[73] Assignee: Nippondenso Co., Ltd., Kariya, Japan

[21] Appl. No.: 260,748

[22] Filed: Jun. 15, 1994

[30] Foreign Application Priority Data

Jun. 16, 1993 [JP] Japan .................... 5-144771

[51] Int. Cl.⁶ .................. F21V 8/00; B60Q 1/04
[52] U.S. Cl. ............... 362/32; 362/61; 362/311
[58] Field of Search ................ 362/32, 61, 80, 362/26, 311

[56] References Cited

U.S. PATENT DOCUMENTS

| | | | |
|---|---|---|---|
| 4,389,698 | 6/1983 | Cibie | 362/32 |
| 4,958,263 | 9/1990 | Davenport et al. | 362/32 |
| 5,165,774 | 11/1992 | Windross | 362/61 |
| 5,257,168 | 10/1993 | Davenport et al. | 362/61 |
| 5,321,586 | 6/1994 | Hege et al. | 362/61 |
| 5,343,367 | 8/1994 | Davenport et al. | 362/61 |
| 5,416,669 | 5/1995 | Kato et al. | 362/32 |
| 5,436,806 | 7/1995 | Kato | 362/61 |
| 5,488,545 | 1/1996 | Kato et al. | 362/32 |
| 5,499,166 | 3/1996 | Kato et al. | 362/32 |

FOREIGN PATENT DOCUMENTS

| | | |
|---|---|---|
| 623780 | 11/1994 | European Pat. Off. . |
| 0120425 | 9/1981 | Japan ................ 362/61 |
| 668702 | 3/1994 | Japan . |

Primary Examiner—Leonard E. Heyman
Attorney, Agent, or Firm—Cushman, Darby & Cushman

[57] ABSTRACT

It is an object of the present invention to provide a lighting device for vehicles which does not irradiate any dazzling rays of light to oncoming vehicles.

According to the present invention, a lighting device for vehicles for irradiating rays of light forward vehicle with a predetermined light distribution comprises light transmitting means, one end of which is disposed at light source, for transmitting rays of light of the light source from the one end to the other end, and lens means, a rear of which is disposed close to the other end of the light transmitting means, for irradiating rays of light forward vehicle from front side thereof, the lens means comprises a first lens, a rear of which is close to one end of the other end of the light transmitting means, a second lens, a rear of which is close to the other end of the other end of the light transmitting means, having a light distribution which is different from that of the first lens, and a spacer defining a gap between the first lens and the second lens so as to form a reflecting layer.

17 Claims, 6 Drawing Sheets

5,562,335

LIGHTING DEVICE FOR VEHICLES

BACKGROUND OF THE INVENTION

1. Field of the Invention

The present invention generally relates to a lighting device for vehicles, and more particularly to a lighting device for head lamp apparatus which transmits rays of light from a central light source to head lamps through optical fibers.

2. Description of the Related Art

As a conventional type of such lighting device, for example, disclosed in the U.S. Pat. No. 4,958,263 (corresponding to the Japanese Unexamined Patent Publication No. 2-172102), a method of transmitting the rays of light from a central light source to the head lamps through optical fibers has recently been examined.

As a related work (not known) for such lighting device, the applicant of the present invention has proposed a lighting device for vehicles as shown in FIG. 6, and filed an U.S. patent application Ser. No. 08/78088 (corresponding to the Japanese Patent Application No. 4-344404 which was published Mar. 11, 1994 under No. 6-68702). In FIG. 8, the lighting unit 50 transmits rays of light from a central light source (not shown) to a flat light lens 52 and a hot zone lens 53 through an optical fiber 51. The transmitted rays of light are then permeated through the flat light lens 52 and the hot zone lens 53 so as to be irradiated as illuminating rays of light. As a connecting surface W between the flat light lens 52 and the hot zone lens 53 is generally expected to be a total-reflection surface, all rays of light having been incident into the flat light lens 52 propagates the inside of the flat light lens 52, and on the other hand, all rays of light having been incident into the hot zone lens 53 propagate the inside of the hot zone lens 53.

According to the above configuration, however, connecting surfaces of the flat light lens 52 and the hot zone lens 53 are contacted along the connecting surface W, and part of the rays of light which should permeate the inside of the flat light lens 52 may enter into the hot zone lens 53 and be irradiated forwards from light emitting surface 55 along a light track 56 shown with two-dot chain line in FIG. 8.

On the other hand, the rays of light having been incident into the flat light lens 52 and the hot zone lens 53 are irradiated forwards from light emitting surfaces 54 and 55 directly or after being reflected by the connecting surface a respectively. As shown in FIG. 8, the rays of light scattered at a corner portion d of the lens incidence surface are partly reflected by a surface X along a light track 57 with a large incident angle, and also partly reflected by a surface Y along a light track 58.

Light distribution curve of the illuminating rays of light irradiated by the above lighting unit 50 for vehicles is shown in FIG. 9. FIG. 9 shows the light distribution pattern which is irradiated on a screen disposed in a predetermined distance forward of the vehicle. That is, there is a problem with this device that the light tracks 56, 57 and 58 are located above a cut line C and dazzling rays of light are caused to irradiate to oncoming vehicles. In FIG. 9, a light distribution curve 59 shown with a solid line is generated by the rays of light emitted from a light emitting surface 55 of the hot zone lens 53, and a light distribution curve 60 shown with a broken line is generated by the rays of light emitted from a emitting surface 54 of the flat light lens 52. Shades 61 and 62 shown in FIG. 10 are disposed between the optical fiber 51 and the flat light lens 52 and hot zone lens 53, and depending on the shape of the shades 61 and 62, the light distribution curves 59 and 60 shown in FIG. 9 are contoured.

SUMMARY OF THE INVENTION

In view of the above problem, it is an object of the present invention to provide a lighting device for vehicles which does not irradiate any dazzling rays of light to oncoming vehicles.

According to the first aspect of the present invention, a lighting device for vehicles for irradiating rays of light forward vehicle with a predetermined light distribution comprises light transmitting means, one end of which is disposed at light source, for transmitting rays of light of the light source from the one end to the other end, and lens means, a rear of which is disposed close to the other end of the light transmitting means, for irradiating rays of light forward vehicle from front side thereof, the lens means comprises a first lens, a rear of which is close to one end of the other end of the light transmitting means, a second lens, a rear of which is close to the other end of the other end of the light transmitting means, having a light distribution which is different from that of the first lens, and a spacer defining a gap between the first lens and the second lens so as to form a reflecting layer.

According to the above configuration, as the gap is formed between the first lens and the second lens by the spacer, rays of light which have been incident into the first lens or the second lens do not permeate into the other lens and are emitted from emitting surface of each lens.

It is preferable that, the gap has a triangle-shape cross-section, in which a width of the gap on front side is larger than a width of the gap on rear side.

It is also preferable that a concave-convex portion is formed on an outer surface of the lens means so as to return scattering rays of light, which has propagated from the light transmitting means into the lens means and reflected by the outer surface and the reflecting layer of the lens means.

According to the above configuration, as the scattering rays of light generated between the first lens and the second lens is prohibited from being irradiated forward vehicle by the concave-convex portion, the rays of light which has been incident with a predetermined incident angle are only irradiated forward vehicle without irradiating any dazzling rays of light to oncoming vehicles.

According to the second aspect of the present invention, a lighting device comprises light distributing means for distributing rays of light with a predetermined light distribution forward vehicle, which includes first light guiding passage defining means for defining first light guiding passage through which the rays of light pass, second light guiding passage defining means for defining second light guiding passage through which the rays of light pass, which is next to the first light guiding passage and has a different light guiding passage from the first guiding light passage, and light permeance prohibiting means formed between the first light guiding means and the second light guiding means for prohibiting the rays of light from permeating the rays of light between the first light guiding passage and second light guiding passage.

According to the above configuration, as the light permeance prohibiting means is formed between the first light guiding means and the second light guiding means, rays of light which have been incident into the first light guiding passage or the second light guiding passage do not permeate into the other light guiding passage and propagate through each light passage.

DETAILED DESCRIPTION OF THE PREFERRED EMBODIMENTS

Figure 1:
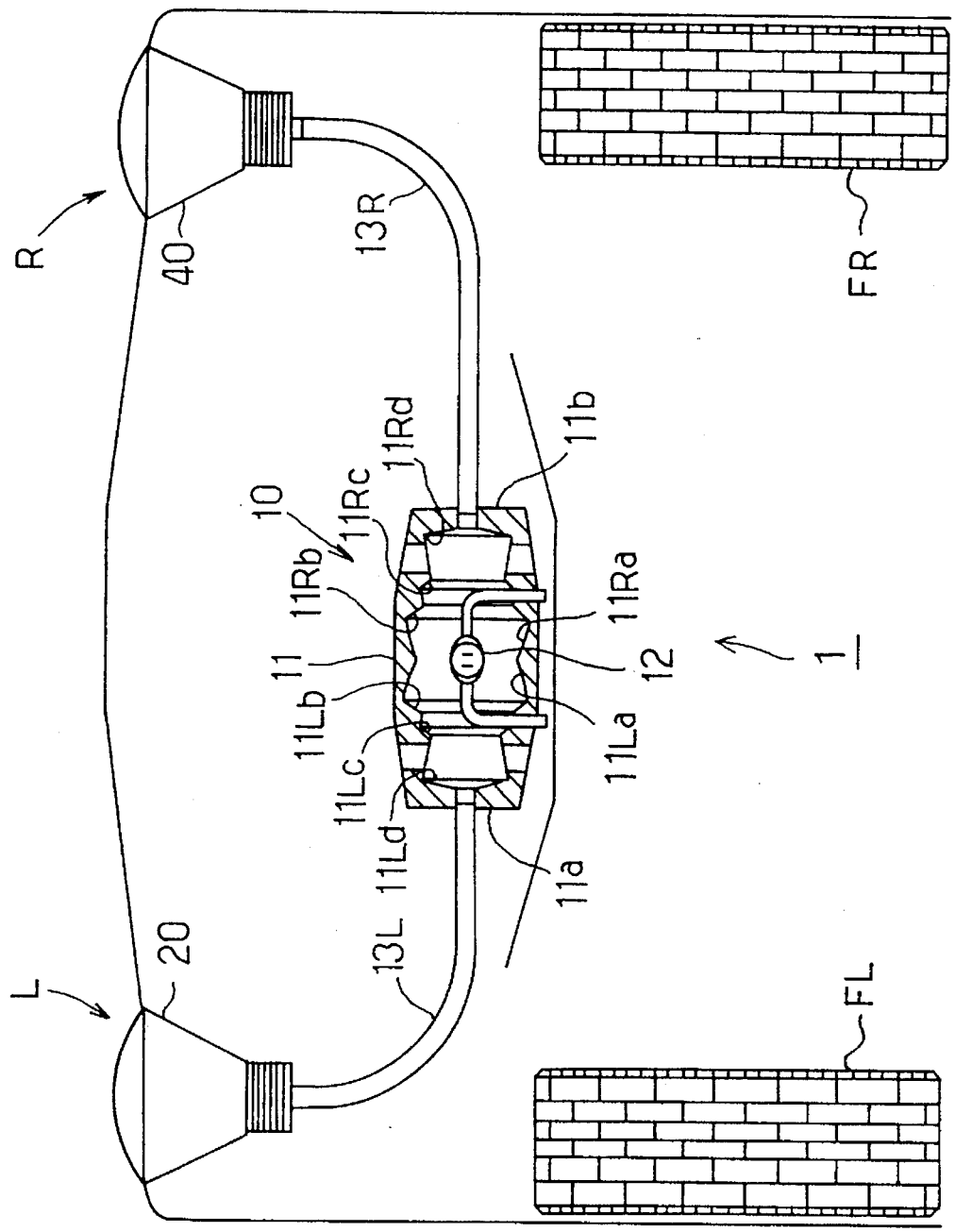
FIG. 1 is a configuration view showing an embodiment of the present invention.

The present invention will be described referring to an embodiment shown in the drawings. The embodiment in which the present invention is applied to a lighting device for vehicles is described.

FIG. 1 shows a configuration of an embodiment of the present invention.

In FIG. 1, this lighting device 1 for vehicles consists of a light source 10 provided at the central position in the transverse direction of a front portion of the vehicle, a left-side head lamp L and a right-side head lamp R, which lamps are provided at positions symmetrical with respect to the light source 10 in the transverse direction of the vehicle. The light source 10 has a generally cylindrical casing 11. Further, a discharge tube 12 used as a linear light source is disposed in the casing 11 in the axial direction. Moreover, on the inner wall of the casing 11, each of left-side ellipsoidal mirrors 11L$a$ to 11L$d$ and a corresponding one of right-side ellipsoidal mirrors 11R$a$ to 11R$d$ are mounted at positions symmetrical with respect to the discharge tube 12 in the transverse direction. Accordingly, light generated by a discharge of the discharge tube 12 is reflected by the right-side ellipsoidal mirror 11R$a$ and each of the left-side ellipsoidal mirror 11L$b$ to 11L$d$ and the light reflected by these mirrors is converged on the center of a right side wall 11$b$ of the casing 11. On the other hand, light emitted from the discharge tube 12 is reflected by the left-side ellipsoidal mirror 11L$a$ and each of the right-side ellipsoidal mirrors 11R$b$ to 11R$d$ and the light reflected by these mirrors is converged on the center of a left-side wall 11$a$ of the casing 11. In FIG. 1, reference characters FL and FR denotes a left-side front tire and a right-side tire, respectively.

The left-side head lamp L comprises a lighting unit 20 provided at a left-side front portion of the vehicle and an optical fiber 13L for connecting this lighting unit 20 and the light source 10. On the other hand, the right-side head lamp R comprises a lighting unit 40 provided at a right-side front portion of the vehicle and an optical fiber 13R for connecting this lighting unit 40 and the light source 10.

Figure 2:
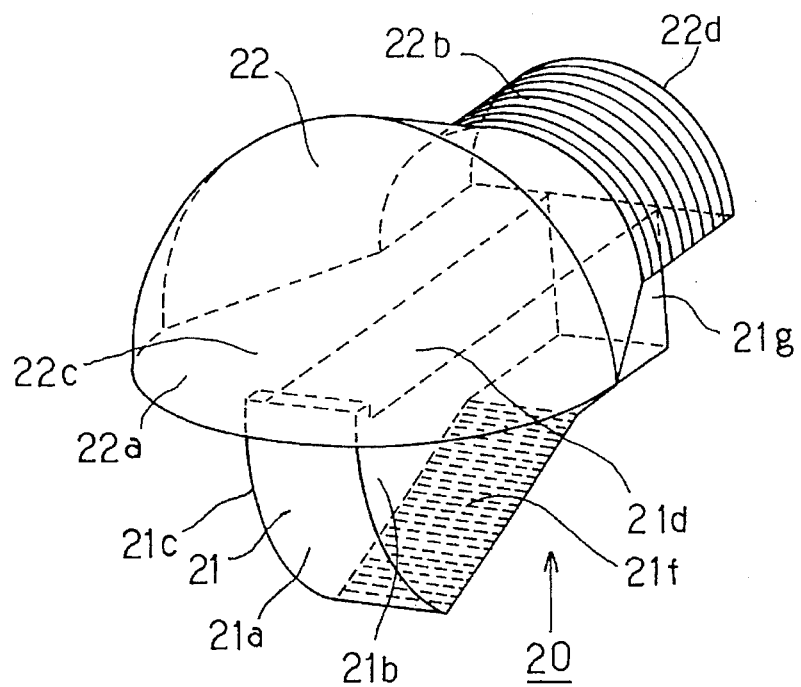
FIG. 2 is a configuration view showing a lighting unit of the embodiment.
Figure 3:
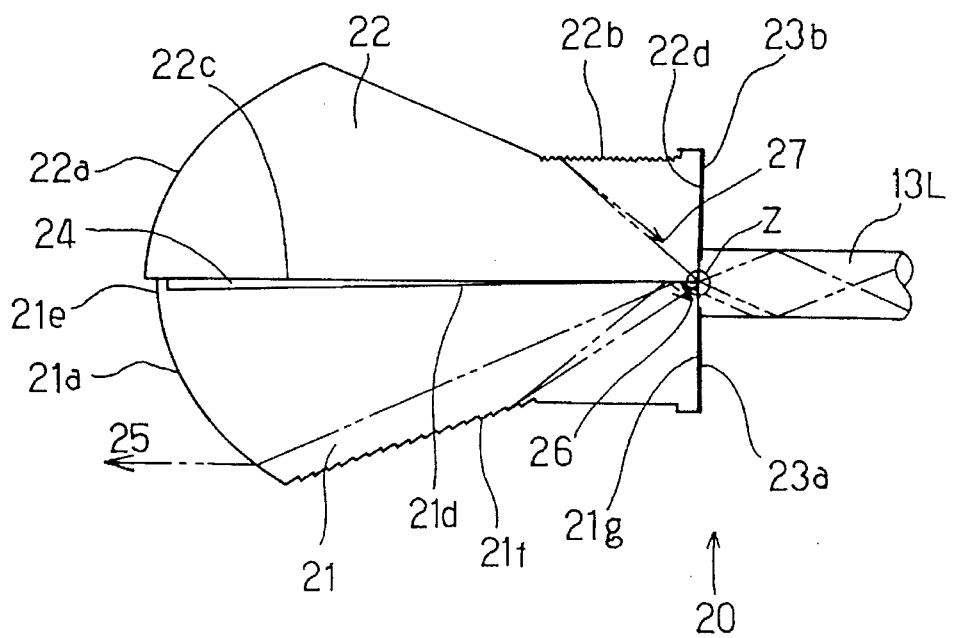
FIG. 3 is a cross-sectional view showing a lighting unit of the embodiment.

Next, structure of the above lighting unit 20 at the left-side front portion is described with respect to FIGS. 2 and 3. Although the lighting unit 20 has a bilateral symmetric structure of the lighting unit 40, these structures are basically identical.

FIG. 2 is a configuration view showing the lighting unit 20, and FIG. 3 is a cross-sectional view thereof. In FIGS. 2 and 3, the identical components are indicated with same reference numerals.

Figure 8:
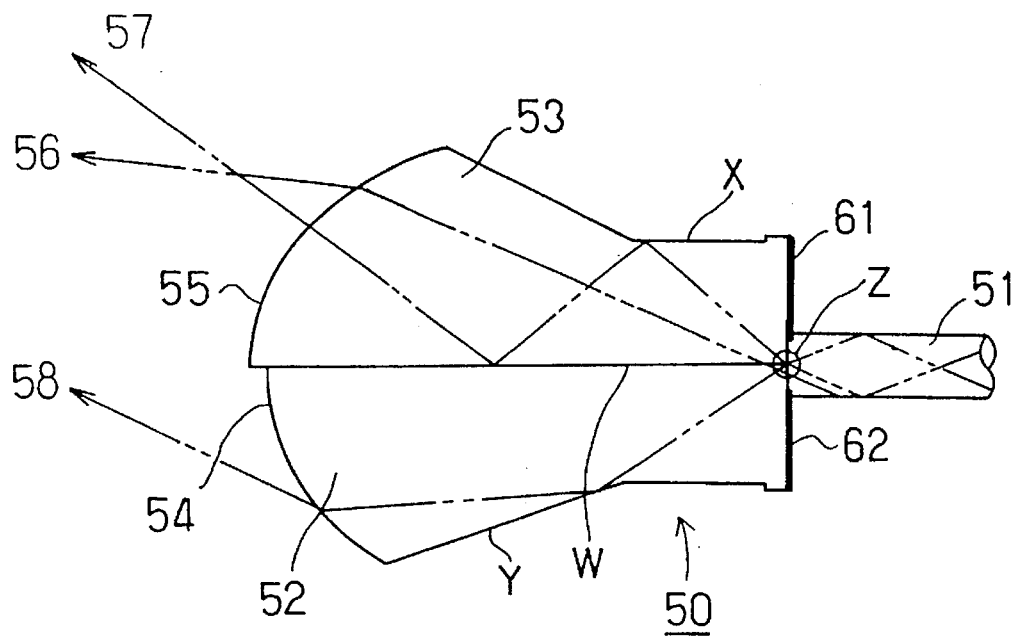
FIG. 8 is a cross-sectional view showing the lighting unit of the related art of the present invention.

In FIG. 2, the lighting unit 20 comprises of a flat light lens 21 and a hot zone lens 22. As shown in FIG. 3, an incidence surface 21$g$ of the flat light lens 21 and an incidence surface 22$d$ of the hot zone lens 22 are fixed to the emitting end surface of the optical fiber 13L through a pair of plate-like shades 23$a$ and 23$b$. Incidentally, the plate-like shades 23$a$ and 23$b$ are the same in shape as shades 61 and 62 shown in FIG. 8.

Figure 6:
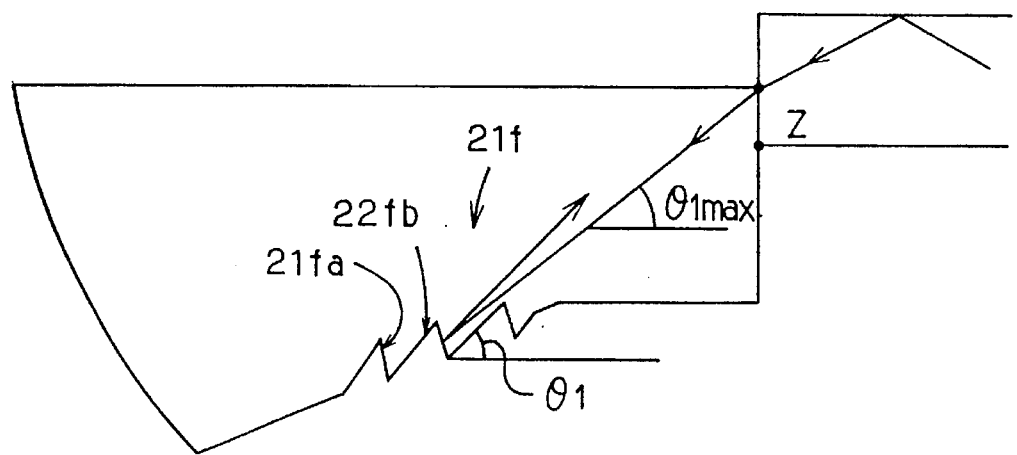
FIG. 6 is a enlarged view showing grooves formed on flat lens of the embodiment.

The flat light lens 21 is made of a material which has high heat resistant and high light permeable (e.g., fluorine type resin) and is formed into a generally half fan-shaped plate. The flat light lens 21 includes an emitting surface 21$a$ which serves to flatly distribute the rays of light, and left-hand side, right-hand side and top surfaces 21$b$, 21$c$ and 21$d$ forms mirror surfaces so as to total-reflect the rays of light having been incident therein. A protrusion 21$e$ is formed on the emitting surface 21$a$, and a gap 24 is formed in a connecting surface between the flat light lens 21 and the hot zone lens 22 by the protrusion 21$e$. Furthermore, a bottom surface 21$f$ is grooved every predetermined distance. The detail of the groove is shown in FIG. 6, an angle θ1 of the grooves formed on the outer peripheral surface is, as shown in FIG. 6, determined to be greater than a maximum angle θ1 of the scattering angle so that scattering light at the corner Z of the incidence portion constantly hits the facing surface 21$fa$ and returns to the side of the corner Z.

Figure 7:
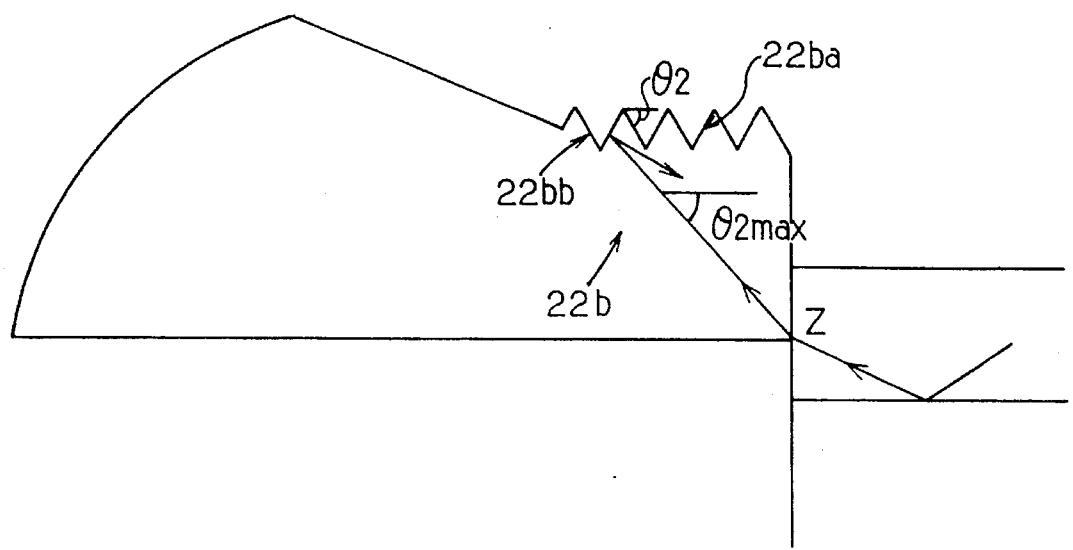
FIG. 7 is a enlarged view showing grooves formed on hot zone lens of the embodiment.

The hot zone lens 22 is made of a material which has high heat resistant and high light permeable (e.g., polycarbonate resin and acrylic resin) and is formed into a generally half conical shape with a curvature surface at a bottom thereof, which has a half lens-shape. The hot zone lens 22 includes an emitting surface 22$a$ which is a lens surface with a predetermined radius of curvature and a bottom surface 22$c$ which is a smooth surface (mirror machined surface) for total reflecting the rays of light having been incident therein. Furthermore, an outer peripheral surface 22$b$ of the hot zone lens 22 is grooved every predetermined distance. An angle θ2 of the grooves formed on the outer peripheral surface is, as shown in FIG. 7, determined to be greater than a maximum angle θ2 of the scattering angle so that scattering light at the corner Z of the incidence portion constantly hits the facing surface 22$ba$ and returns to the side of the corner Z.

In this embodiment, the flat light lens 21 and the hot zone lens 22 corresponds to light guidance passages, the protrusion 21$e$ formed on the flat light lens 21 corresponds to a light permeance prohibiting means, and the grooves formed on the bottom surface 21$f$ of the flat light lens 21 and the grooves formed on the outer peripheral surface 22$b$ of the hot zone lens 22 correspond to scattering light emitting prohibiting means.

Next, the condition when the rays of light are emitted into the lighting unit 20 of the above configuration will be described.

In the flat light lens 21 shown in FIG. 2, as the light refractive index of the air is smaller than that of the flat light lens 21 at the left-hand side and right-hand side surfaces 21b and 21c respectively, the rays of light are total-reflected without leaking rays of light from the left-hand side and right-hand side surfaces 21b and 21c to the outside. For this reason, all the rays of light emitted into the flat light lens 21 are alternatingly total-reflected at the inside of the left-hand side and right-hand side surfaces and guided forward.

Furthermore, as shown in FIG. 3, incident lights emitted towards the top surface 21d along a light track 25 among all the rays of light emitted from the incidence surface 21g of the flat light lens 21 are total-reflected by the top surface 21d without permeating into the hot zone lens 22. This is because the gap 24 is formed between the flat light lens 21 and the hot zone lens 22 by the protrusion 21e formed on the flat light lens 21 and therefore the light refractive index of the gap 24 is smaller than that of the flat light lens 21. The gap 24 shown in FIG. 3 forms a long triangle shape lying, the summit of which is at a corner portion Z.

As shown in FIG. 3, the rays of light scattered by the corner portion Z of the incidence surface of each lens propagate towards the bottom surface 21f with a large incident angle along a light track 26. The rays of light along the light track 26 propagated and reached the bottom surface 21f are reflected without being emitted out of the emitting surface 21a, because the grooves are provided on the bottom surface 21f.

The rays of light along the light track 25 guided as the above are emitted from the emitting surface 21a of the flat light lens 21 horizontally with respect to up and down directions and expansively with respect to side directions as flat rays of light.

On the other hand, as the focus of the emitting surface 22a of the hot zone lens 22 is located nearby the incidence surface 22d of the hot zone lens 22, the rays of light emitted into the hot zone lens 22 radially propagates and reaches the emitting surface 22a from the incidence surface 22d. Then, the radial rays of light reached the emitting surface 22a is parallelly emitted from the emitting surface 22a.

In the same way of the flat light lens 21, the rays of light scattered by a corner portion Z of each lens incidence surface propagate towards the outer peripheral surface 22b with large incident angles along the light track 27, as shown in FIG. 3. The rays of light along the light tracks 27 propagated and reached the outer peripheral surface 22b are reflected by the grooves provided thereon towards the incidence surface 2d, and not permitted to be emitted out of the emitting surface 22a. Due to the above arrangement, the rays of light parallelly projected from the projection surface 22a of the hot zone lens 22 can reach far away as highly brilliant and clear imagery light.

Figure 4:
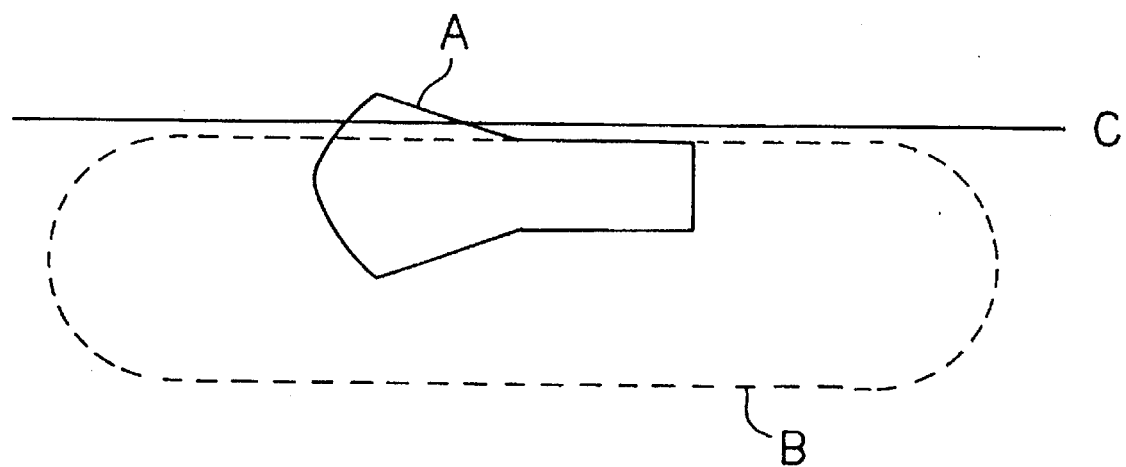
FIG. 4 is a light distribution curve of the irradiated rays of light irradiated from the lighting unit of the embodiment.
Figure 5:
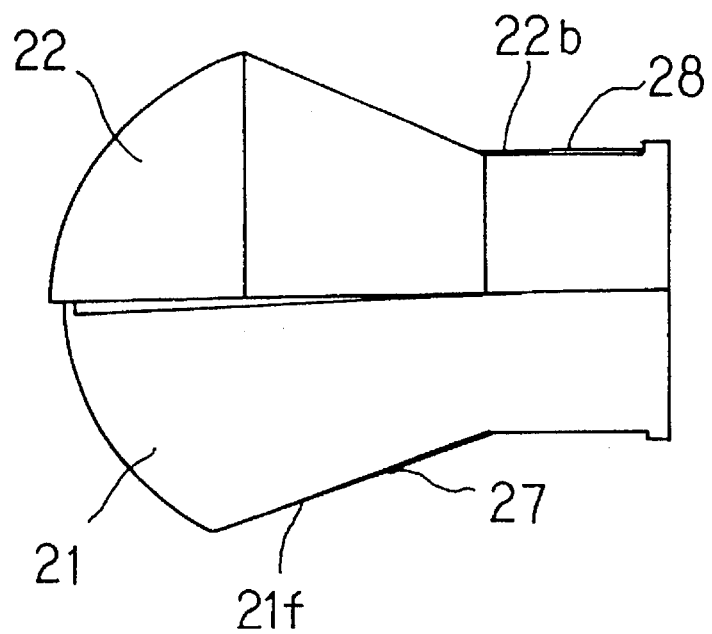
FIG. 5 is a cross-sectional view showing another embodiment.

The light distribution curve of the rays of light irradiated from the lighting unit 20 was experimentally examined, and the results is shown in FIG. 4.

Figure 9:
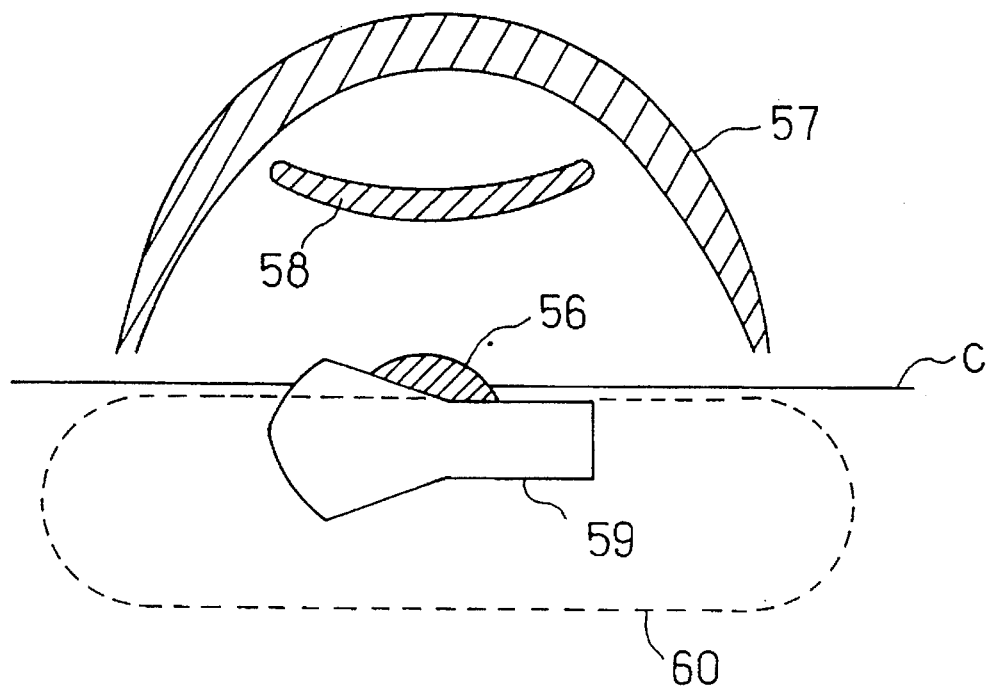
FIG. 9 is the light distribution curve of the irradiated rays of light irradiated from the lighting unit of the related art.
Figure 10:
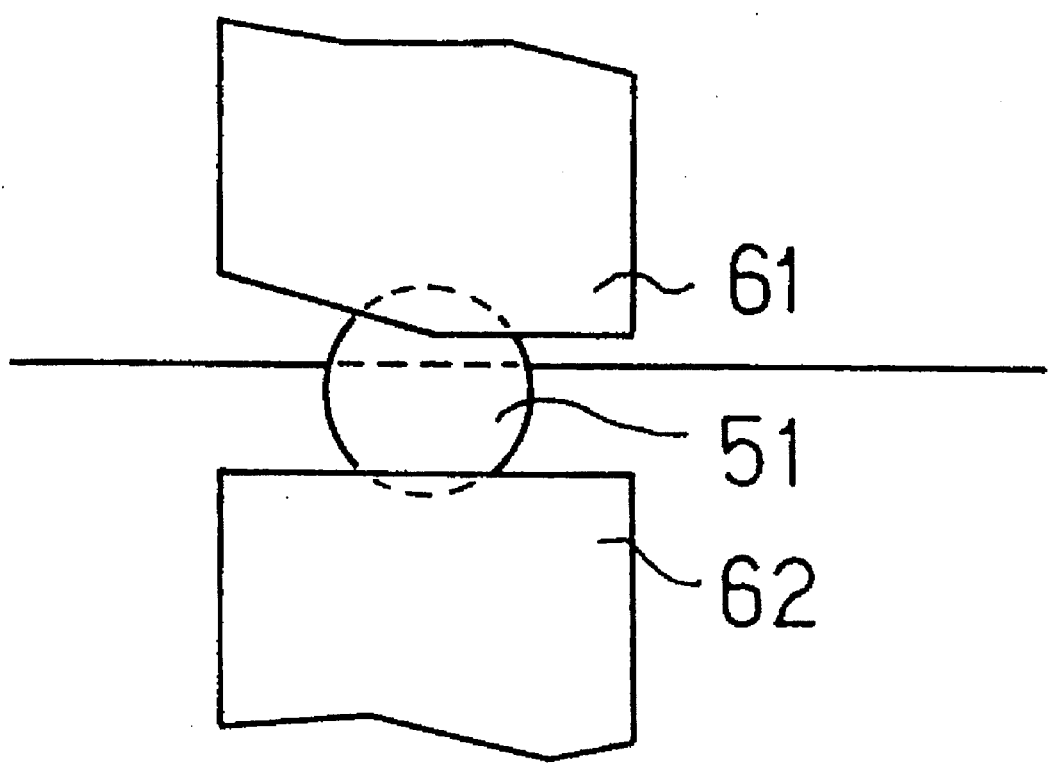
FIG. 10 is a front view of both shades of the lighting unit of the related art.

In FIG. 4, a light distribution curve A indicated by a solid line is generated by the rays of light emitted from the emitting surface 22a of the hot zone lens 22, and a light distribution light B indicated by a broken line is generated by the rays of light emitted from the emitting surface 21a of the flat light lens 21. As shown in FIG. 4, the light distribution curve above a cut line C which irradiates dazzling rays light to oncoming vehicles is identified with only the roughly triangle portion at the left-hand side portion of the light distribution curve A and above the cut line C. Compared with the light distribution curve of a related lighting unit 50 shown in FIG. 9, the lighting unit 20 has no such light distribution curves 56, 57 and 58 which are above the cut line C. From the above results, the lighting unit 20 does not irradiate any dazzling rays of light to oncoming vehicles.

In FIG. 4, the light distribution curve A protrudes in a generally triangle portion at the left-hand side, one upwards and the other downwards. These triangle protrusions are generated by the shades 23a and 23b respectively.

In this embodiment, the bottom surface 21f of the flat light lens 21 and the outer peripheral surface 22b of the hot zone lens 22 are grooved. However, the present invention is not limited to this configuration, but may apply rough surfaces 27 and 28 to the bottom surface 21f and the outer peripheral surface 22b respectively. Further, in case the lenses 21 and 22 are formed by molding, the same effects are obtained by making the mold for the portions 27 and 28 with rough surface. Namely, according to such rough surfaces, when scattering rays of light from the corner portion Z is reflected, the rays of light is diffused, as a result, glare light is reduced.

What is claimed is:

1. A lighting device for vehicles for irradiating rays of light forward comprising:

a light source for generating rays of light;

light transmitting means, one end of which is disposed at said light source, for transmitting said rays of light from said one end to an other end thereof; and lens means, a rear of which is disposed close to said other end of said light transmitting means, for irradiating rays of light forward;

said lens means comprises:

a first lens, a rear of which is close to one portion of said other end of said light transmitting means;

a second lens, a rear of which is close to another portion of said other end of said light transmitting means, having a light distribution which is different from that of said first lens; and a spacer defining a gap between said first lens and said second lens so as to form a reflecting layer.

2. A lighting device according to claim 1, wherein said spacer is a protrusion which is integrally formed with said first lens or said second lens.

3. A lighting device for vehicles for irradiating rays of light forward comprising:

a light source for generating rays of light;

light transmitting means, one end of which is disposed at said light source, for transmitting said rays of light from said one end to an other end thereof; and lens means, a rear of which is disposed close to said other end of said light transmitting means, for irradiating rays of light forward;

said lens means comprises:

a first lens, a rear of which is close to one portion of said other end of said light transmitting means; and a second lens, a rear of which is close to another portion of said other end of said light transmitting means, having a light distribution which is different from that of said first lens;

wherein a gap is formed between said first lens and said second lens so as to form a reflecting layer, and said gap has a triangle-shape cross-section, in which a width of said gap on a front side is larger than a width of said gap on a rear side.

4. A lighting device for vehicles for irradiating rays of light forward comprising;

a light source for generating rays of light;

light transmitting means, one end of which is disposed at said light source, for transmitting said rays of light from said one end to an other end thereof; and lens means, a rear of which is disposed close to said other end of said light transmitting means, for irradiating rays of light forward;

said lens means comprises:

a first lens, a rear of which is close to one portion of said other end of said light transmitting means;

a second lens, a rear of which is close to another portion of said other end of said light transmitting means, having a light distribution which is different from that of said first lens; and a reflecting layer formed between said first lens and said second lens;

wherein an outer surface of said lens means is formed so as to return scattering rays of light, which has propagated from said light transmitting means into said lens means and reflected by said outer surface and said reflecting layer of said lens means, towards said other end of said light transmitting means.

5. A lighting device for vehicles for irradiating rays of light forward comprising:

a light source for generating rays of light;

light transmitting means, one end of which is disposed at said light source, for transmitting said rays of light from said one end to an other end thereof; and light distributing means for said rays of light with a predetermined light distribution forward vehicle, which includes first light guiding passage defining means for defining first light guiding passage through which said rays of light pass, second light guiding passage defining means for defining second light guiding passage through which said rays of light pass, which is next to said first light guiding passage and has a different light passage from said first light passage, and light permeance prohibiting means formed between said first light guiding means and said second light guiding means for prohibiting said rays of light from permeating said rays of light between said first light guiding passage and second light guiding passage.

6. A lighting device for vehicles according to claim 5, wherein said first light guiding defining means is a flat light lens for flatly distributing said rays of light.

7. A lighting device for vehicles according to claim 6, wherein said second light guiding defining means is a hot zone lens for distributing said rays of light.

8. A lighting device for vehicles according to claim 6, wherein light permeance prohibiting means is a protrusion which is formed into one-unit with said flat light lens.

9. A lighting device for vehicles according to claim 5, further comprising a scattering light emitting prohibiting means for prohibiting scattering rays of light generated between said first light guiding passage and said second light guiding passage from irradiating forward vehicle through said first light passage and second light passage.

10. A lighting device for vehicles according to claim 9, wherein said first light guiding defining means is a flat light lens for flatly distributing said rays of light.

11. A lighting device for vehicles according to claim 10, wherein said a scattering light emitting prohibiting means is a groove formed on outer surface of said flat light lens.

12. A lighting device for vehicles according to claim 9, wherein said second light guiding defining means is a hot zone lens for distributing said rays of light.

13. A lighting device for vehicles according to claim 12, wherein said a scattering light emitting prohibiting means is a groove formed on outer surface of said hot zone light lens.

14. A lighting device for vehicles according to claim 9, wherein light permeance prohibiting means is a protrusion which is formed into one-unit with said flat light lens.

15. A lighting device for irradiating rays of light forward, comprising:

a light source for generating rays of light; light transmitting means, one end of which is disposed at said light source, for transmitting said rays of light from said one end to an other end thereof; and lens means a rear of which is disposed close to said other end of said light transmitting means, for irradiating rays of light forward from front side thereof, wherein:

said lens means is formed from light transparent material and has an incidence surface and an emitting surface between which is filled with said light transparent material, said emitting surface has a predetermined curved face refracting main light which is injected from said incidence surface with a predetermined broadening in a desirable direction, and a surface excluding said incidence surface and said emitting surface of said lens means partly has reflection preventing means for preventing reflection of light toward said emitting surface so that light excluding said main light is prevented from transmitting to said emitting surface.

16. A lighting device according to claim 15, further comprising an optical fiber connected to said incidence surface to emit said main light, said optical fiber having said predetermined broadening.

17. A lighting device according to claim 16, wherein said surface excluding said incidence surface and said emitting surface of said lens means has a reflection means for reflecting a part of said main light to said emitting surface.

* * * * *